(12) United States Patent
Wu et al.

(10) Patent No.: US 7,557,872 B2
(45) Date of Patent: Jul. 7, 2009

(54) THIN FILM TRANSISTOR ARRAY

(75) Inventors: Ming-Zen Wu, Renwu Township, Kaohsiung County (TW); Yuan-Hao Chang, Taipei (TW)

(73) Assignee: Chunghwa Picture Tubes, Ltd., Taipei (TW)

( * ) Notice: Subject to any disclaimer, the term of this patent is extended or adjusted under 35 U.S.C. 154(b) by 263 days.

(21) Appl. No.: 11/197,821

(22) Filed: Aug. 5, 2005

(65) Prior Publication Data

US 2006/0256246 A1    Nov. 16, 2006

(30) Foreign Application Priority Data

May 11, 2005   (TW) ............................... 94115166 A (51) Int. Cl.
*G02F 1/1343* (2006.01)
(52) U.S. Cl. ........................................ 349/39
(58) Field of Classification Search .................... 349/39
See application file for complete search history.

(56) References Cited

U.S. PATENT DOCUMENTS

| | | | |
|---|---|---|---|
| 5,737,049 A * | 4/1998 | Shin et al. ..................... | 349/122 |
| 5,796,448 A | 8/1998 | Kim ............................ | 349/39 |
| 6,078,365 A * | 6/2000 | Ueda et al. ..................... | 349/43 |
| 6,628,368 B2 * | 9/2003 | Yang .......................... | 349/192 |
| 6,958,788 B2 * | 10/2005 | Choi et al. ..................... | 349/43 |
| 7,133,087 B2 * | 11/2006 | Kim ............................ | 349/39 |
| 2003/0016310 A1 | 1/2003 | Lee ............................ | 349/43 |
| 2003/0117535 A1 * | 6/2003 | Park et al. ..................... | 349/39 |
| 2004/0090562 A1 * | 5/2004 | Song et al. .................... | 349/39 |

FOREIGN PATENT DOCUMENTS

| | | |
|---|---|---|
| DE | 102 28 519 | 1/2003 |
| JP | 2001-044442 | 2/2001 |

* cited by examiner

*Primary Examiner*—James A Dudek
(74) *Attorney, Agent, or Firm*—J.C. Patents (57) ABSTRACT

A thin film transistor array comprises a substrate, a plurality of thin film transistors, a plurality of pixel electrodes, a plurality of common-used distributed lines and a plurality of auxiliary electrodes, wherein the thin film transistors, the pixel electrodes and the auxiliary electrodes are respectively disposed in each exposure shot formed on the substrate. A first overlapped area exists between drains and gates so as to form parasitic capacitances between the sources and the gates. Each auxiliary electrode is disposed under the pixel electrodes and extends over the common-used distributed lines along the direction to its one side. A second overlapped area exists between the auxiliary electrodes and the common-used distributed lines so as to form storage capacitances between each auxiliary electrode and its corresponding common-used distributed line.

9 Claims, 8 Drawing Sheets

THIN FILM TRANSISTOR ARRAY

CROSS-REFERENCE TO RELATED APPLICATION

This application claims the priority benefit of Taiwan application serial no. 94115166, filed on May 11, 2005. All disclosure of the Taiwan application is incorporated herein by reference.

BACKGROUND OF THE INVENTION

1. Field of the Invention

The present invention generally relates to a thin film transistor array (TFT array), and more particularly, to a thin film transistor array capable of raising a uniformity of brightness.

2. Description of Related Art

A significant advance of a multimedia society benefits a considerable development of semiconductor devices and display devices. Furthermore, in the display devices' field, the thin film transistor array with advantages of high image quality, high compactness, low power consumption and free radiation have become a main stream of the market.

Figure 1:
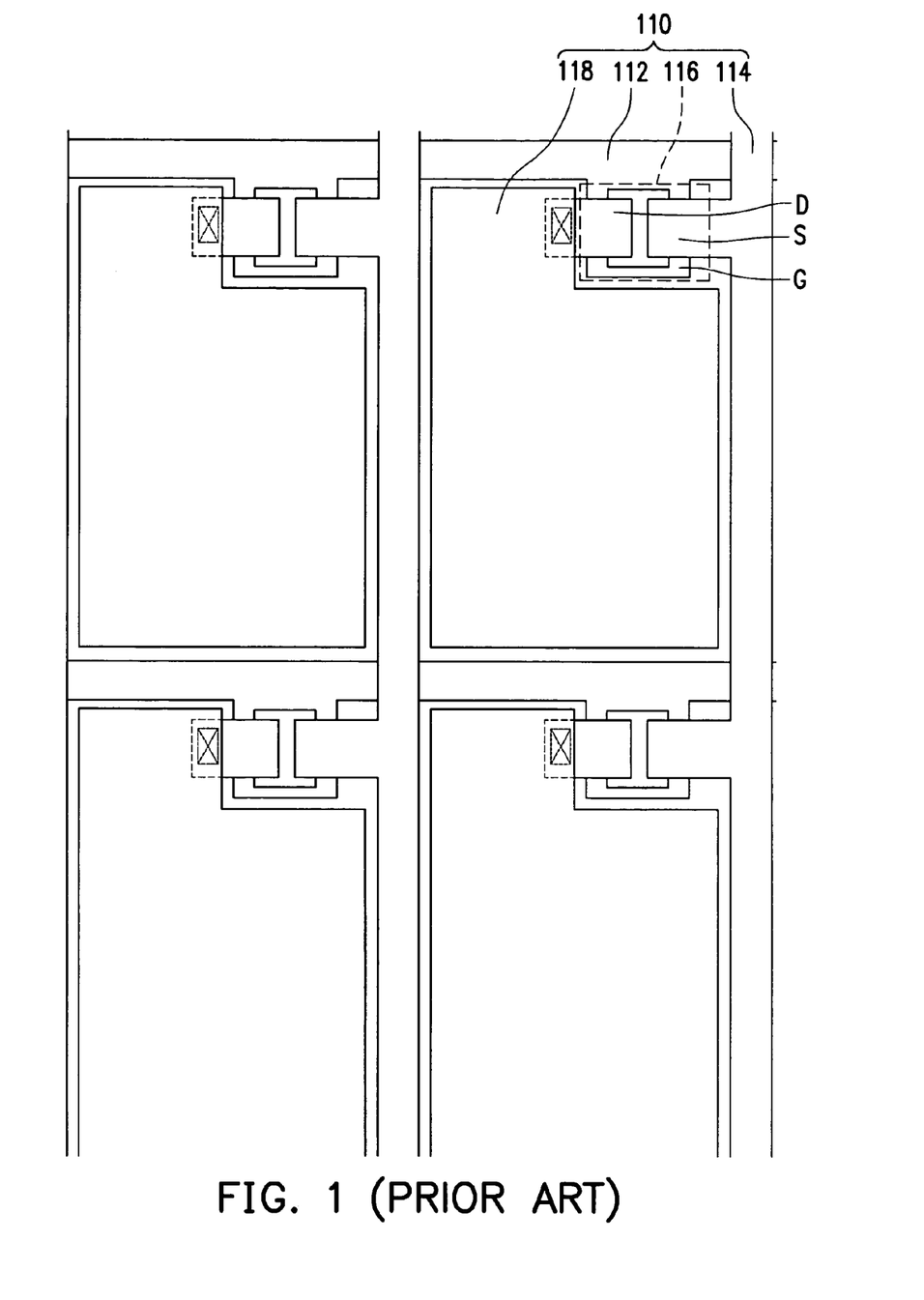
FIG. 1 schematically shows a top view of one conventional thin film transistor array.

The thin film transistor liquid crystal display comprises the thin film transistor array, colour filters and a liquid crystal layer. FIG. 1 shows a top view of a conventional thin film transistor array. Referring to FIG. 1, the thin film transistor array 100 comprises a plurality of pixels 110 arranged in an array, wherein each pixel structure 110 consists of a scan line 112, a data line 114, a thin film transistor 116 and a pixel electrode 118 disposed in corresponding to the thin film transistor 116.

Referring to FIG. 1, the thin film transistor 116 is used as a switch element of each pixel structure 110 while the scan line 112 and the data line 114 are used to provide the selected pixel structure 110 with proper operating voltages for respectively driving the selected pixel structure 110 to display an image.

Figure 2:
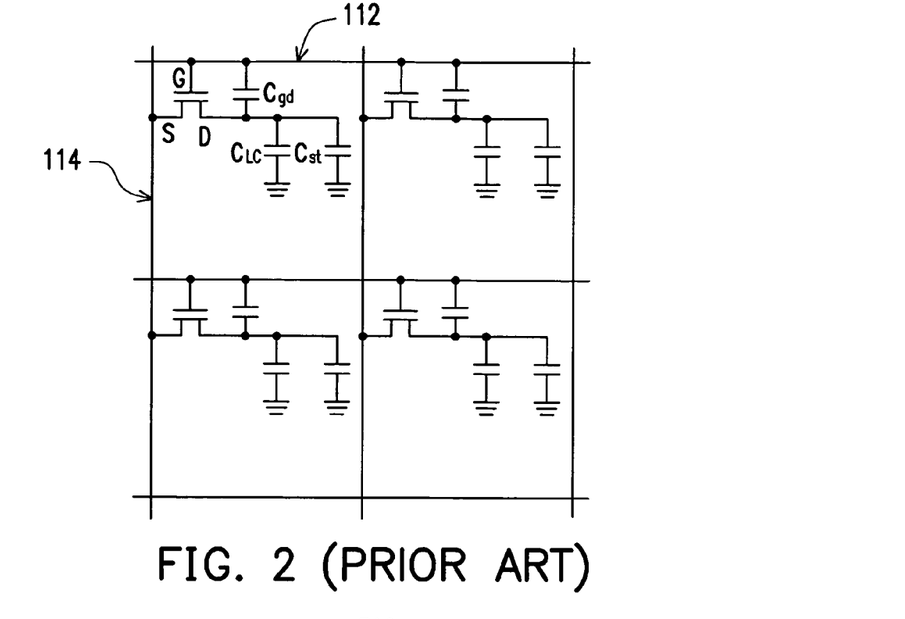
FIG. 2 schematically shows an equivalent circuit of one pixel of a conventional thin film transistor array.

FIG. 2 shows a schematic equivalent circuit diagram of one pixel of a conventional thin film transistor liquid crystal display. Referring to FIG. 2, the pixel of a conventional thin film transistor liquid crystal display generally comprises a thin film transistor, a liquid crystal capacitance $C_{LC}$ and a storage capacitor $C_{ST}$.

Referring to FIG. 1 and FIG. 2 concurrently, the liquid crystal capacitor $C_{LC}$ is constituted by a coupling between the pixel electrode 118 in the thin film transistor array 100 and a common electrode (not shown) disposed on the colour filter. In addition, the storage capacitor $C_{ST}$ is disposed on the thin film transistor array 100 and electrically connected to the liquid crystal capacitor $C_{LC}$ and the scan line 112. Besides, the gate G, the sources S and the drain D of the thin film transistor 116 are electrically connected to the scan line 112, the data line 114 and the liquid crystal capacitor $C_{LC}$ of the pixel electrode 118, respectively. Moreover, since there is an overlapped area between the gate G and the drain D, there exists a parasitic capacitance $C_{gd}$ between the gate G and the drain D.

Referring to FIG. 1 and FIG. 2 concurrently again, since there exists a specific relationship between a voltage applied the liquid crystal capacitor $C_{LC}$ (i.e. a voltage applied to the pixel electrode 118 and the common electrode) and a light transmittance of liquid crystal molecules, a predetermined image can be displayed by controlling the voltage applied the liquid crystal capacitor $C_{LC}$ in accordance with the desired predetermined image. In addition, when the thin film transistor 116 is off, the voltage of the liquid crystal capacitor $C_{LC}$ is kept a constant value (i.e. at a holding state). However, as there exists the parasitic capacitance $C_{gd}$ between the gate G and the drain D, the holding voltage of the liquid crystal capacitor $C_{LC}$ varies in accordance with signal variation of the data line 114 (i.e. so called coupling effect), thereby causing the holding voltage of the liquid crystal capacitor $C_{LC}$ deviates its predetermined value. This voltage variation is called a feed-through voltage $\Delta V_P$, which is expressed as the following:

$$\Delta V_p = \frac{C_{gd}}{C_{gd} + C_{st} + C_{LC}} \Delta V_g \qquad (1)$$

Wherein $\Delta V_g$ is amplitude of a pulse voltage applied the scan line 112.

Among current exposure processes for fabricating the thin film transistor array disposed on a substrate, most use a stepper to form shots in the panel. In other words, the thin film transistor array's pattern is composed of the shots formed by the stepper. Therefore, a stepper's position deviation resulting from its moving causes positions of patterns formed by each exposure shot to be deviated during each exposure period. Specifically, when an overlapped area between the gate G and the source S (shown in FIG. 1) of the thin film transistor 116 is different for every neighbour shots, which causes the parasitic capacitance $C_{gd}$ (capacitance between the gate G and the source S) in each exposure shot to be different.

Figure 3:
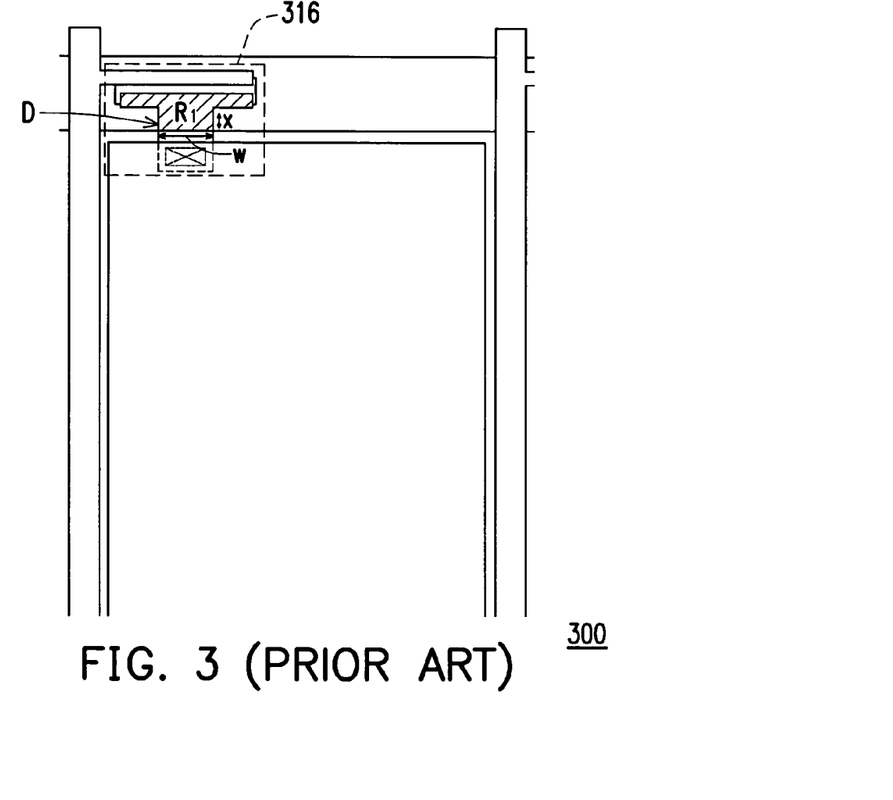
FIG. 3 schematically shows a top view of another conventional thin film transistor array.

To solve the above mentioned problem, a conventional thin film transistor array is provided, which is shown in FIG. 3. Referring to FIG. 3, the conventional thin film transistor array's drains are designed to have a T shape so as to reduce the possible generated overlapped area R1 between the drain and the gate to be W×X, thereby further reducing parasitic capacitance variations in each exposure shot.

In addition, another solution to solve mentioned problem is to exploit a obscuring design added between different exposure shots to reduce a shot mura (referred to a variety of trace phenomena caused by a non-uniform brightness) occurred at boundary of the exposure shots. However, when exposure precision deviation is too large, the above two solutions still can't effectively improve a non-uniformity brightness problem caused by masks' shift-error.

SUMMARY OF THE INVENTION

Accordingly, the present invention is directed to a thin film transistor array, in which each pixel's precision error does not affect the feed-through voltage so that a display constituted by the thin film transistor array have a superior display quality.

The present invention is further directed to a thin film transistor array, which constitutes a display with a larger aperture and uniform brightness concurrently.

A thin film transistor array of the present invention comprises a substrate, a plurality of transistors, a plurality of pixel electrodes, a plurality of common-used distributed lines and a plurality of auxiliary electrodes. In addition, the substrate is partitioned into a plurality of pixel shots, in which the plurality of transistors are respectively disposed and the transistors comprise gates, a channel layers, sources and drains. In each thin film transistor, a first overlapped area exists between the drain and the gate so as to form a parasitic capacitance between the source and the gate. The plurality of pixel electrodes is also disposed in each pixel shot. Moreover, the common-used distributed lines are disposed on the substrate and a portion of them is positioned underneath the pixel electrodes.

Furthermore, the auxiliary electrodes are respectively disposed in each pixel shot and underneath the pixel electrodes, extending over the common-used distributed lines to its one side in a direction parallel to the extending direction of the drain. Moreover, a second overlapped area exists between the auxiliary electrodes and the common-used distributed lines. The auxiliary electrodes are respectively electrically connected to their corresponding pixel electrodes, thereby forming a storage capacitance between the auxiliary electrodes and the common-used distributed lines.

In one embodiment of the present invention, the common-used distributed lines in each pixel shot comprise a first stripe pattern and a second stripe pattern, wherein the extending direction of the first stripe pattern is distinct from that of the second stripe pattern. For example, the extending direction of the first stripe pattern is orthogonal to that of the second stripe pattern.

In one embodiment of the present invention, the auxiliary electrodes in each pixel shot, for example, is partially disposed between the pixel electrodes and the first stripe pattern and/or the second stripe pattern.

In one embodiment of the present invention, the thin film transistor array, for example, further comprises a passivation layer, disposed the pixel electrodes and the auxiliary electrodes, the sources as well as the drains. In this embodiment, the passivation layer, for example, further comprises a plurality of first contact holes. In addition, the pixel electrodes are respectively filled into the plurality of first contact holes and electrically connected to the sources, as well as the auxiliary electrodes.

The thin film transistor array of another embodiment of the present invention comprises a substrate, a plurality of transistors, a plurality of pixel electrodes, a plurality of common-used distributed lines, a plurality of conductive blocks and a plurality of auxiliary electrodes. In addition, the substrate is partitioned into a plurality of pixel shots, in which the plurality of transistors are respectively disposed and the transistors comprise gates, a channel layers, sources and drains. In each thin film transistor, a first overlapped area exists between the drain and the gate so as to form a parasitic capacitance between the source and the gate. The plurality of pixel electrodes is also disposed in each pixel shot. Moreover, the source of each thin film transistor extends over the channel layer to be underneath the pixel electrode corresponding to each thin film transistor, and is electrically connected to the pixel electrode. More, the common-used distributed lines are disposed on the substrate and a portion of them is positioned underneath the pixel electrodes.

Furthermore, the connection conductive layers are respectively disposed in each pixel shot and over the common-used distributed lines, and electrically connected to them. The auxiliary electrodes are respectively disposed in each pixel shot and underneath the pixel electrodes and the connection conductive layers, extending over the common-used distributed lines to its one side along the longitudinal direction of the drain. Besides, a second overlapped area exits between the auxiliary electrodes and the common-used distributed lines. The auxiliary electrodes are respectively electrically connected to their corresponding pixel electrodes, thereby forming a storage capacitance between the auxiliary electrodes and the common-used distributed lines. In addition, sandwiched capacitances are formed between the conductive blocks and each auxiliary electrode.

In another embodiment of the present invention, the common-used distributed lines in each pixel shot comprise a first stripe pattern and a second stripe pattern, wherein the extending direction of the first stripe pattern is distinct from that of the second stripe pattern. For example, the extending direction of the first stripe pattern is orthogonal to that of the second stripe pattern.

In one embodiment of the present invention, the auxiliary electrodes in each pixel shot, for example, is partially disposed between the pixel electrodes and the first stripe pattern and/or the second stripe pattern.

In one embodiment of the present invention, the thin film transistor array, for example, further comprises a passivation layer, disposed the pixel electrodes and the auxiliary electrodes, the sources as well as the drains. In this embodiment, the passivation layer, for example, further comprises a plurality of first contact holes. In addition, the pixel electrodes are respectively filled into the plurality of first contact holes and electrically connected to the sources, as well as the auxiliary electrodes.

In one embodiment of the present invention, the thin film transistor array, for example, further comprises a gate-insulated layer, disposed between the source, the drain and the gate, as well as between the auxiliary electrodes and the common-used distributed lines. In this embodiment, the passivation layer, for example, further comprises a plurality of second contact holes, which, for example, pass through the passivation layer and the gate-insulated layer. In addition, the connection blocks are respectively filled into the plurality of second contact holes and electrically connected to common-used distributed lines.

The present invention can solve the problem of inferior display quality caused by alignment error during a period of the thin film transistor's exposure process in the conventional display panel, and does not adversely affect aperture's size of the panel.

The objectives, other features and advantages of the invention will become more apparent and easily understood from the following detailed description of the invention when taken in conjunction with the accompanying drawings.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to a decoding device for product code decoding and decoding method thereof, examples of which are illustrated in the accompanying drawings. Wherever possible, the same reference numbers are used in the drawings and the descriptions to refer to the same parts.

Auxiliary electrodes are designed to be disposed in the thin film transistor array according to the present invention so as to obtain a specific ratio between $C_{gd}$ (capacitance between the gate G and the source S) and the storage capacitance $C_{ST}$ in each exposure shot. Therefore, the feed-through voltage in each exposure shot approaches the same vale. The following takes several embodiments to describe the present invention, but not limited to.

Figure 4:
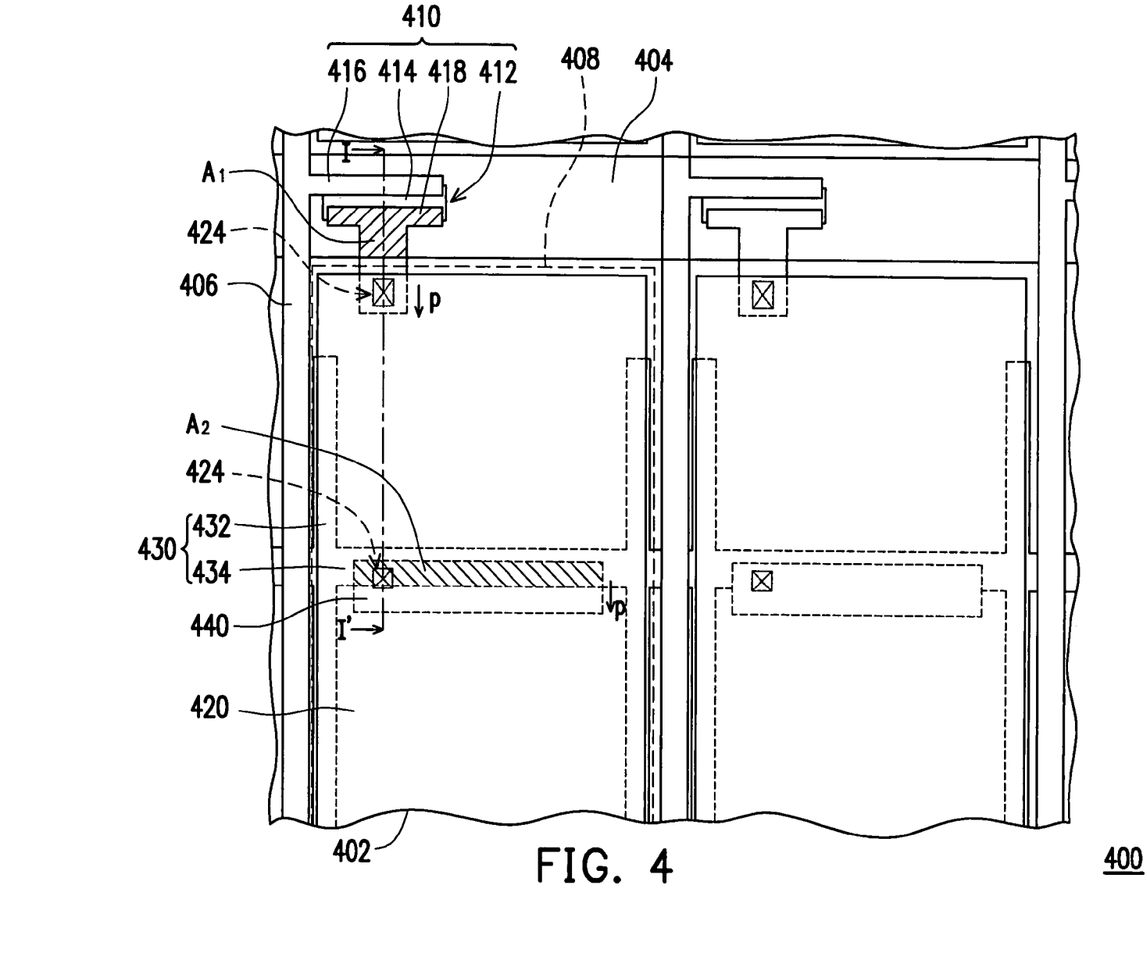
FIG. 4 schematically shows a top view of a thin film transistor array of the first embodiment of the present invention.
Figure 5:
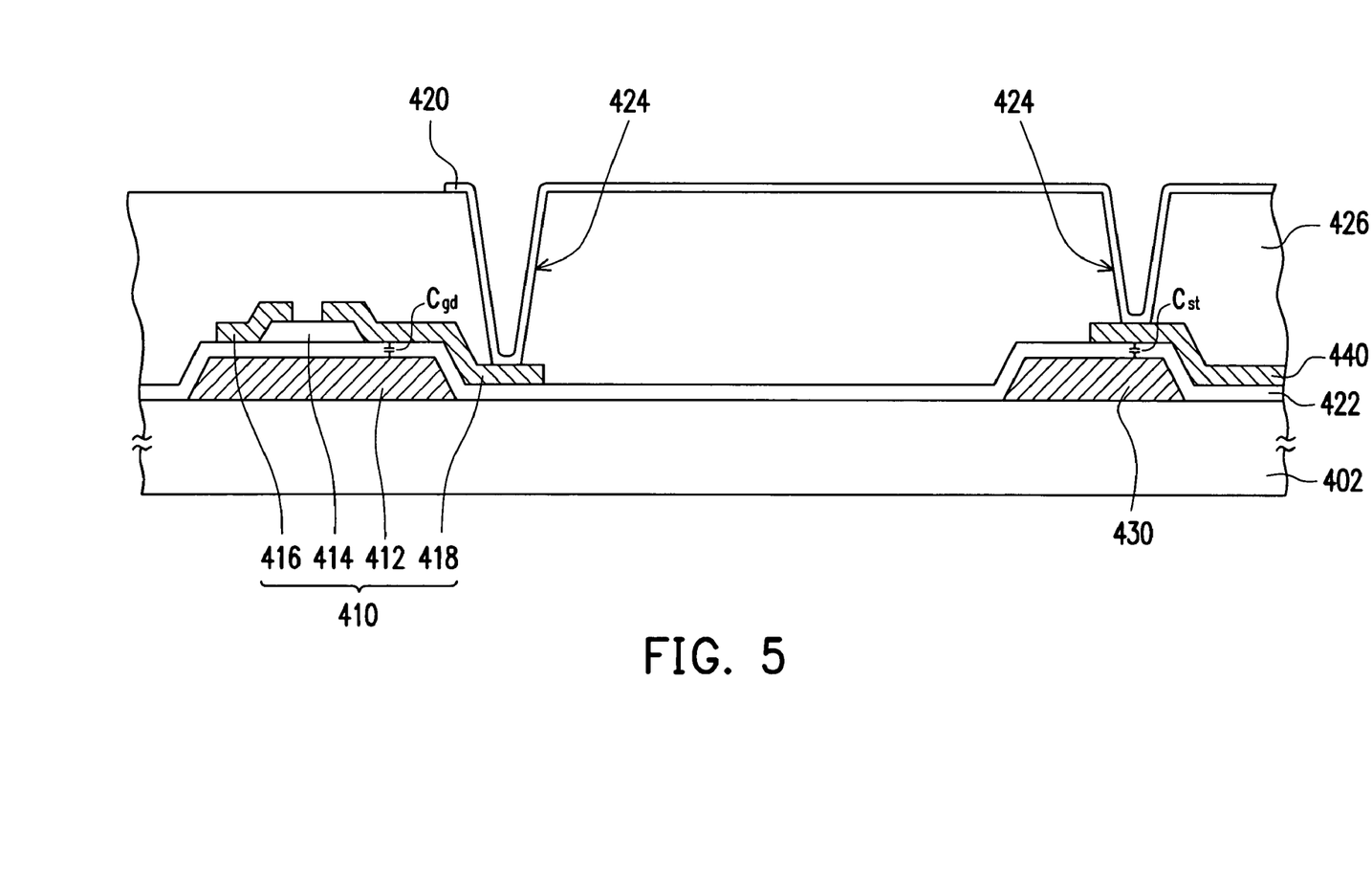
FIG. 5 schematically shows a cross sectional view along I-I' line of the thin film transistor array shown in FIG. 4.

FIG. 4 schematically shows a top view of a thin film transistor array of the first embodiment of the present invention and FIG. 5 schematically shows a cross sectional view along I-I' line of the thin film transistor array shown in FIG. 4. Referring to FIG. 4, a thin film transistor array 400 comprises a substrate 402, a plurality of transistors 410, a plurality of pixel electrodes 420, a plurality of common-used distributed lines 430 and a plurality of auxiliary electrodes 440. In addition, the substrate 402, on which scan lines 404 and data lines 406 are disposed, is partitioned into a plurality of pixel shots 408. Furthermore, the plurality of pixel electrodes 420 are respectively disposed in each pixel shot 408.

More, each transistor 410 is disposed in each pixel shot 408 and comprises a gate 412, a channel layer 414, a source 416 and a drain 418. In addition, the gate 412 is electrically connected to the scan lines 404 and since the gate 412 and the scan lines 404 are formed in one process, one portion of the scan lines 404 can be used as the gate 412 of the thin film transistor 410 as shown in FIG. 4. The source 416 is electrically connected to the data lines 406 and the drain 418 extends a direction p over the channel layer 414 to be underneath the pixel electrode 420, and is electrically connected to the pixel electrode 420 as well. It is noticeable that a first overlapped area $A_1$ exists between the gate 412 and the drain 418, which thus forms a parasitic capacitance $C_{gd}$ (shown in FIG. 5) between the gate 412 and the drain 418.

Referring to FIG. 4 again, the plurality of common-used distributed lines 430 is disposed on the substrate 402 and further some portions of them are under the pixel electrodes 420. More, each common-used distributed line 430 is positioned between two neighbor scan lines 404. In addition, the common-used distributed line in each pixel shot, for example, comprises a first stripe pattern 432 and a second stripe pattern 434, wherein the extending direction of the first stripe pattern 432, for example, is distinct from that of the second stripe pattern 434. In this embodiment, the extending direction of the first stripe pattern 432 is orthogonal to that of the second stripe pattern 434. Alternatively, the first stripe pattern 432, for example, is parallel to the data distributed line 406 while the second stripe pattern 434, for example, is parallel to the scan distributed line 414. Obviously, one of ordinary skill in the art should realize the common-used distributed line 430 can be present in other patterns and the present invention is not limited to these patterns.

More specifically, auxiliary electrodes 440 are disposed in each pixel shot 408 and underneath the pixel electrodes 420, extending over the common-used distributed line 430 along the direction p to its one side. In addition, the direction p, for example, is orthogonal to the extending direction of the second stripe pattern 434 of the common-used distributed line 430. The auxiliary electrode 440 extends over the second stripe pattern 434 of the common-used distributed line 430 along the direction p to its one side. As a result, a second overlapped area $A_2$ exists between the auxiliary electrode 440 and the common-used distributed line 430.

Referring to FIG. 5, it is well known in the art that prior to form the gate 412 and the common-used distributed line 430, a gate-insulated layer 422 is formed on the substrate 402 and then the channel layer 414 is formed on the gate-insulated layer 422. he gate 412, the drain 418 and the gate-insulated layer 422 form the parasitic capacitance $C_{gd}$ between the gate and the drain.

In addition, after the source 416 and the drain 418 are formed, a passivation layer 426 is first formed on the substrate 402 to cover the thin film transistor 410, the common-used distributed line 430 and the auxiliary electrode 440, and then the pixel electrode 420 is formed on the passivation layer 426. Moreover, the protection layer 426 comprises a plurality of first contact holes 424 for exposing the drain 418 of the thin film transistor 410 and the pixel electrode 420 is filled into the first contact holes 424 to be electrically connected to the drain 418.

It is noticeable that a portion of the first contact holes 424 also exposes the auxiliary electrode 440. In other words, the pixel electrode 420, filled into the first contact hole 424, is also electrically connected to the auxiliary electrode 440. Hence, the auxiliary electrode 440 of the present invention has the same electrical potential as the auxiliary electrode 440 and a storage capacitance $C_{st}$ is formed between the second overlapped area $A_2$ of the auxiliary electrode 440 and the common-used distributed line 430.

Referring to FIG. 4, since a photolithography processes of the drain 418 and the auxiliary electrode 440 is completed by a same mask, the first overlapped area $A_1$ is smaller than a preset value when the mask has a shift-error during the exposure period, so does the second overlapped area $A_2$. Likewise, the first overlapped area $A_1$ is larger than a preset value when the mask has a shift-error, so does the second overlapped area $A_2$. That is, parasitic capacitance $C_{gd}$ between the gate and the drain and the storage capacitance $C_{st}$ increase or decrease concurrently due to the process's error.

Furthermore, from the expression equation (see equation 1) of the feed-through voltage $\Delta V_P$, in a case that $\Delta V_g$ and the liquid crystal capacitance $C_{LC}$ are constant values, if the parasitic capacitance $C_{gd}$ between the gate and the drain and the storage capacitance $C_{st}$ increase or decrease concurrently in a proper proportionality, the feed-through voltage $\Delta V_P$ can be maintained a constant value. Referring to FIG. 4, the present invention designs the shape and area of the auxiliary electrode 440 in accordance with the foregoing principle so as to make a storage capacitance $C_{st}$ variation caused by the process error and the parasitic capacitance $C_{gd}$ variation between the gate and the drain have a proper proportionality. As a result, even if areas of the first overlapped area $A_1$ and the second overlapped area $A_2$ are different due to the process error, the feed-through voltage $\Delta V_P$ in each pixel shot 408 is kept the same.

Figure 6:
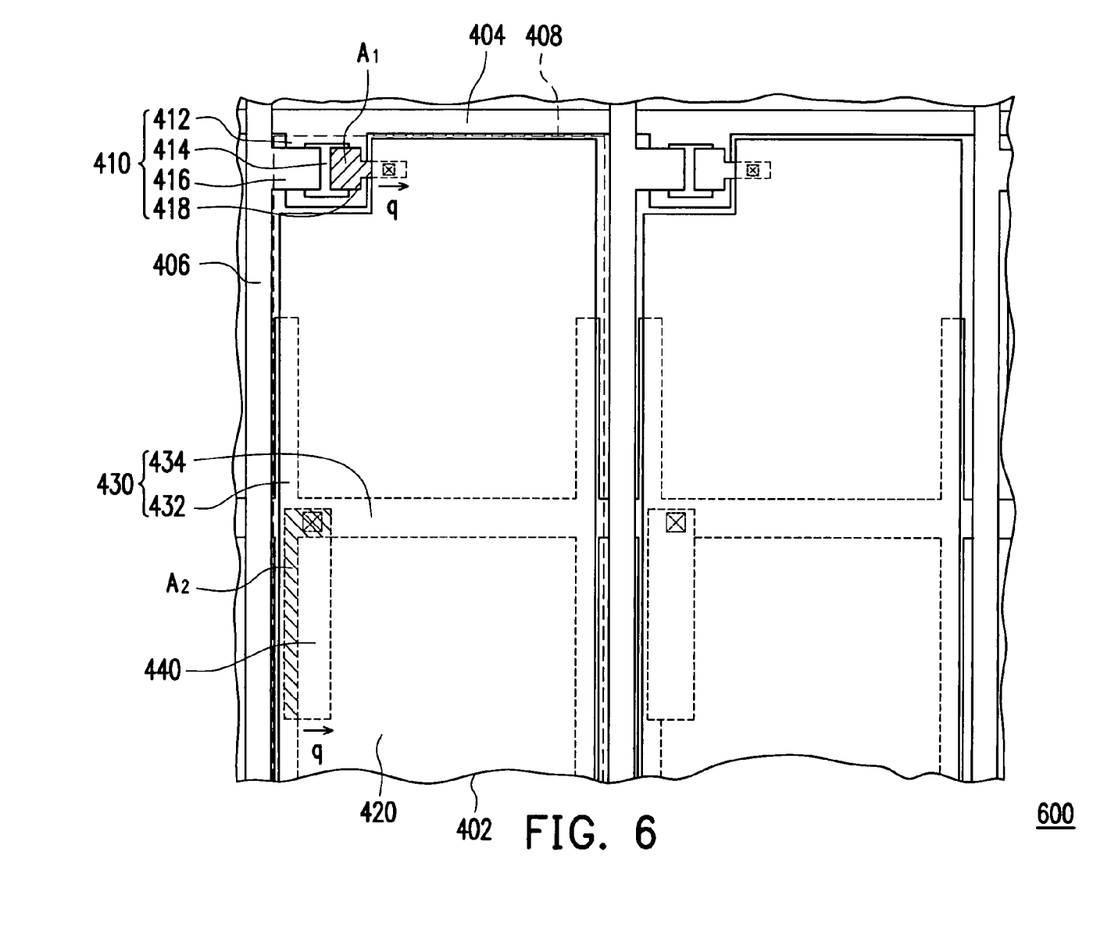
FIG. 6 schematically shows a top view of a thin film transistor array of the second embodiment of the present invention.

FIG. 6 schematically shows a top view of a thin film transistor array of the second embodiment of the present invention. In general, a thin film transistor array 600 of the second embodiment is similar to that of the first embodiment and the following describes their discrepancies.

Referring to FIG. 6, the drain 412 of the thin film transistor 410 extends over the channel layer 414 along a direction q to be underneath the pixel electrode 420, and is electrically connected to the pixel electrode 420 through the first contact hole opening 424. In addition, the auxiliary electrode 440 extends over the common-used distributed line 430 along a direction q to its one side. Moreover, the direction q, for example, is orthogonal to the extending direction of the first stripe pattern 432 of the common-used distributed line 430 while the auxiliary electrode 440 extends over the first stripe pattern 432 of the common-used distributed line 430 along a direction q to its side. Therefore, when there is a shift-error of the drain 418 in the direction q, there also is a shift-error of the auxiliary electrode 440 in the direction q. As a result, the first overlapped area $A_1$ between the drain 418 and the gate 412, and the second overlapped area $A_2$ between the auxiliary electrode 440 and the common-used distributed line 430, increase or decrease concurrently in a proper proportionality, which maintains the feed through-voltage in each pixel shot 408 at a constant value.

It is noticeable that although the storage capacitance $C_{st}$ variation of this embodiment is determined by the overlapped area variation between the auxiliary electrode 440 and the common-used distributed line 430, the auxiliary electrode 440 is partially overlapped over the second stripe pattern 434 of the common-used distributed line 430 to increase the storage capacitance $C_{st}$ in each pixel shot 408. Likewise, in the first embodiment of the present invention, the auxiliary electrode 440 is partially overlapped over the first stripe pattern 432 of the common-used distributed line 430 and one of ordinary skill in the art is able to realize its details without further description through another schematic diagram.

In addition, another embodiment of the present invention further provides a thin film transistor array, which, in addition to attain the above mentioned functionalities, decrease the area of the auxiliary electrode without affecting the storage capacitance's value because of a distance reduction between two electrode plates of the storage capacitance. Thus, the aperture's size of the thin film transistor array is increased. The following takes an embodiment to describe it.

Figure 7:
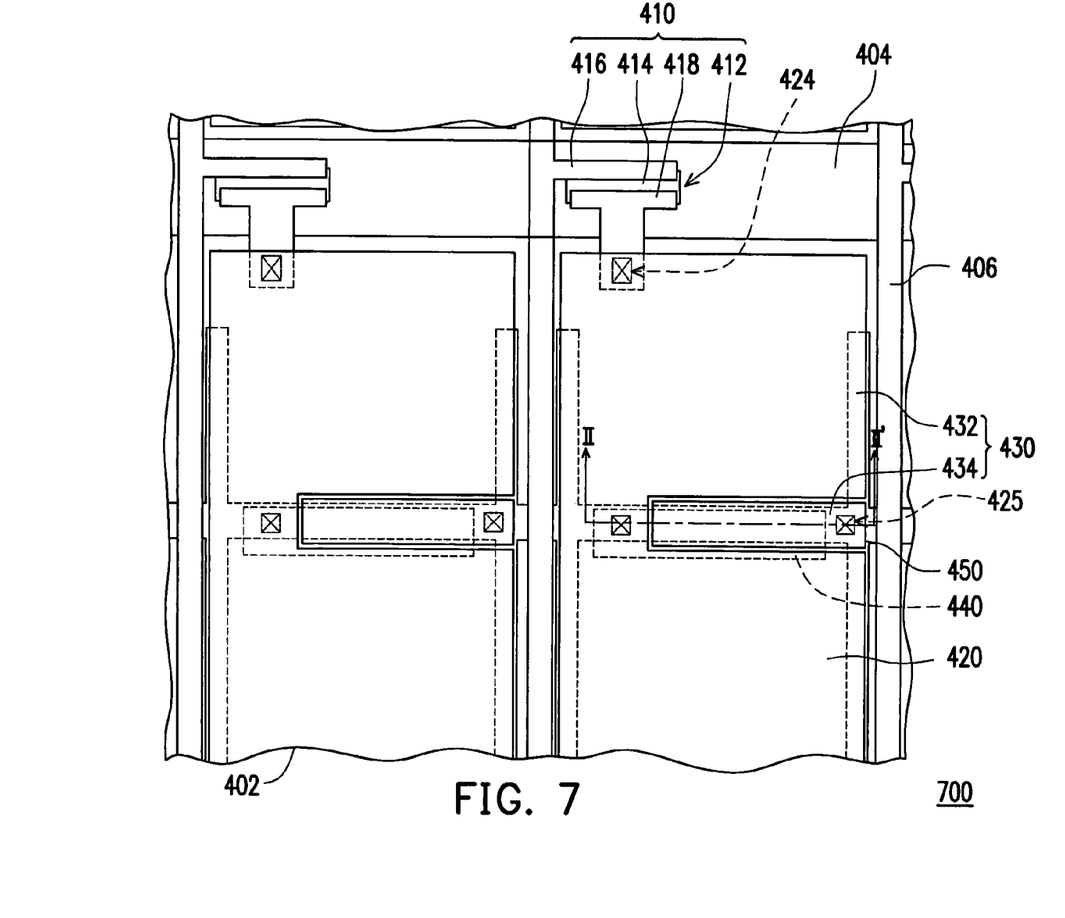
FIG. 7 schematically shows a top view of a thin film transistor array of the third embodiment of the present invention.
Figure 8:
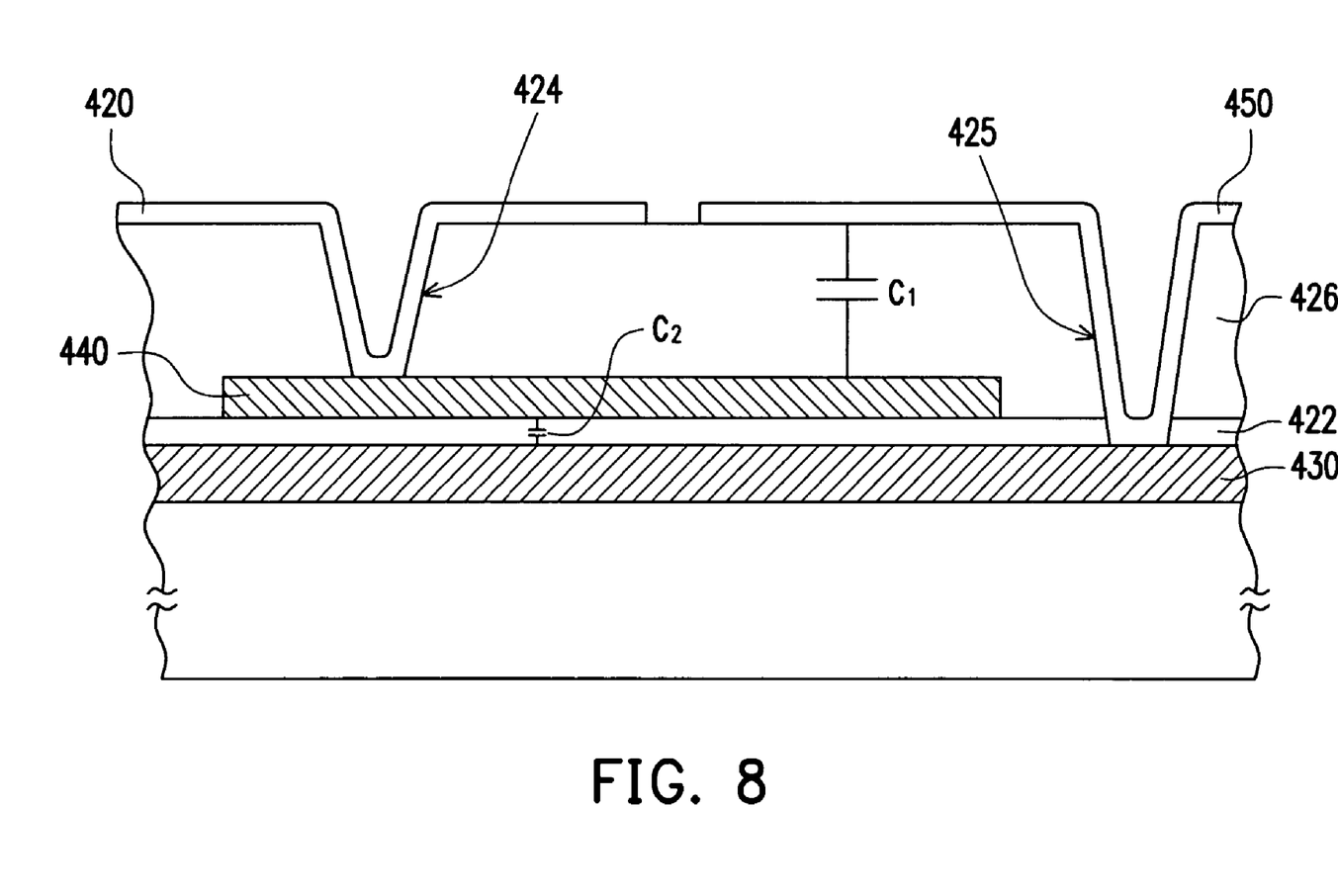
FIG. 8 schematically shows a cross sectional view along II-II' line of the thin film transistor array shown in FIG. 7.

FIG. 7 schematically shows a top view of a thin film transistor array of the third embodiment of the present invention and FIG. 8 schematically shows a cross sectional view along II-II' line of the thin film transistor array shown in FIG. 7. In general, a thin film transistor array 700 of the third embodiment is similar to that of the first embodiment and the following describes their discrepancies.

Referring to FIG. 7 and FIG. 8 concurrently, in addition to elements shown in FIG. 4, each pixel shot 408 in a thin film transistor array 700 further comprises a plurality of conductive blocks 450, disposed on the auxiliary electrodes 440 and the common-used distributed lines 430, as well as electrically connected to the common-used distributed lines 430. In this embodiment, the passivation layer 426, for example, further comprises a plurality of second contact holes 425 that pass through the passivation layer 426 and the gate-insulated layer 422 to expose a portion of the common-used distributed line 430 in each pixel shot 408. Therefore, the plurality conductive blocks 450 disposed on the passivation layer 426 are electrically connected to the common-used distributed lines 430 by filling the plurality of conductive blocks 450 into the second contact holes 425.

In addition, the plurality of conductive blocks 450 and a pixel electrode 720 are fabricated by using a same mask. That is, the plurality of conductive blocks 450, for example, like the pixel electrode 720, is constituted by transparent conductive oxide. Surely, the plurality of conductive blocks 450 and the pixel electrode 720 may be patterned by using different masks and the present invention is not limited to the patterning process.

Referring to FIG. 8, from the above description, the plurality of conductive blocks 450 have the same electrical potential as the common-used distributed lines 430 and storage capacitances C1 are formed between the plurality of conductive blocks 450 and the auxiliary electrodes 440. In addition, as mentioned in the first embodiment, the pixel electrode 720 is filled into the first contact holes 424 of the passivation layer 426 to be electrically connected to the auxiliary electrode 440 and storage capacitances C2 are formed between the auxiliary electrodes 440 and the common-used distributed lines 430. Therefore, the storage capacitance $C_{st}$ of this embodiment is an equivalent capacitance of the storage capacitance C1 connected to the storage capacitance C2 in parallel.

It is well known that a capacitance of a capacitor is proportion to areas of two electrode plates and inversely proportion to a distance between these two electrode plates. According to this principle, in this embodiment, since the distance between the plurality of conductive blocks 450 and the auxiliary electrode 440 and the distance between the auxiliary electrode 440 and the common-used distributed line 430 are short, compared with the thin film transistor array with the same storage capacitance $C_{st}$, the thin film transistor array 700 of this embodiment may further reduce area of the auxiliary electrode 440 to increase the aperture's size of the thin film transistor array 700.

Figure 9:
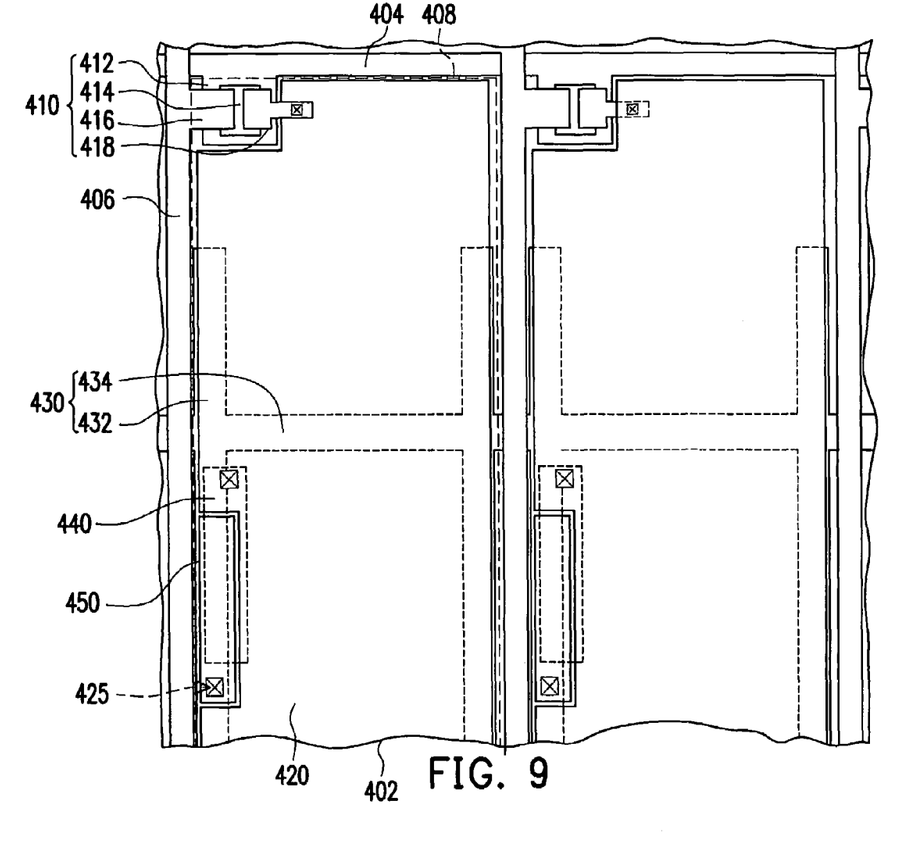
FIG. 9 schematically shows a top view of a thin film transistor array of the fourth embodiment of the present invention.

FIG. 9 schematically shows a top view of a thin film transistor array of the fourth embodiment of the present invention. Referring to FIG. 9, It is noticeable that although the auxiliary electrode 440 and the conductive layer 450, shown in FIG. 7, are disposed on the second stripe pattern 434 of the common-used distributed line 430, as mentioned in the foregoing description, the auxiliary electrode 440 and the plurality of conductive blocks 450 of this embodiment may be disposed on the first stripe pattern 432 of the common-used distributed line 430. Surely, the auxiliary electrode 440 and the plurality of conductive blocks 450 further may be disposed on the first stripe pattern 432 and the second stripe pattern 434 (not shown) and the present invention is not limited to their disposed positions.

The thin film transistor array of the present invention disposes a auxiliary electrode in each pixel shot and forms a storage capacitance constituted by the auxiliary electrode and a common-used distributed line. When the parasitic capacitances with different capacitance values, caused by the mask's shift-error during the exposure period, are formed in each exposure shot, different storage capacitances are also formed in each exposure shot simultaneously. In addition, when the parasitic capacitance between the gate and the drain in one certain exposure shot is larger/smaller than that in previous one exposure shot, the storage capacitance in one certain exposure shot is larger/smaller than that in previous one exposure shot and the ratio between the storage capacitance variation and the parasitic capacitance variation between the gate and the drain are kept a constant value. Thus, the feed-through voltage in each exposure shot is maintained a constant value, thereby promoting display quality of the display panel implementing the thin film transistor array of the present invention.

In addition, the plurality of conductive blocks of the present invention are further disposed in the thin film transistor array and form the storage capacitances between the auxiliary electrodes and the common-used distributed lines, as well as between the plurality of conductive blocks and the auxiliary electrodes. That is, the distance between two electrode plates of the storage capacitor is reduced, so does the auxiliary electrode without changing electrical performances of the storage capacitances. Thus, the aperture's size of the thin film transistor array is increased.

In summary, the present invention can solve the problem of inferior display quality caused by alignment error during a period of the thin film transistor's exposure process in the conventional display panel, and does not adversely affect the aperture's size of the panel.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A thin film transistor array, comprising:
   a substrate, comprising a plurality of pixel shots;
   a plurality of thin film transistors, respectively disposed in each pixel shot and each thin film transistor comprising a gate, a channel layer, a source and a drain, wherein the channel layer is disposed between the source, the drain and the gate, and a first overlapped area is formed between the source and the gate, thereby forming a parasitic capacitance between the source and the gate;
   a plurality of pixel electrodes, respectively disposed in each pixel shot, wherein each drain extends over its corresponding channel layer along a direction to be underneath its corresponding pixel electrode, and each drain is electrically connected to the pixel electrode;
   a plurality of common-used distributed lines, disposed on the substrate and a portion of the common-used distributed lines being underneath the pixel electrode;
   a plurality of conductive blocks, respectively disposed in each pixel shot and over the common-used distributed lines, wherein the plurality of conductive blocks is respectively electrically connected to the common-used distributed lines; and
   a plurality of auxiliary electrodes, respectively disposed underneath the pixel electrode in each exposure shot and each auxiliary electrode extending over its corresponding common-used distributed line along the direction to the corresponding common-used distributed line's one side, wherein a plurality of first storage capacitances are formed between the plurality of conductive blocks and their corresponding auxiliary electrodes, a second overlapped area is formed between each auxiliary electrode and its corresponding common-used distributed line, and the auxiliary electrodes are respectively electrically connected to their corresponding pixel electrodes to form a plurality of second storage capacitances between the auxiliary electrodes and their corresponding common-used distributed lines.

2. The thin film transistor array according to claim 1, wherein the common-used distributed line in each exposure shot comprises a first stripe pattern and a second stripe pattern, and an extending direction of the first stripe pattern is distinct from that of the second stripe pattern.

3. The thin film transistor array according to claim 2, wherein in each exposure shot, the first stripe pattern of the common-used distributed line is orthogonal to the second stripe pattern of the common-used distributed line.

4. The thin film transistor array according to claim 2, wherein in each exposure shot, the conductive block is disposed over the first stripe pattern and /or the second stripe pattern.

5. The thin film transistor array according to claim 1, further comprises a passivation layer, disposed between the pixel electrodes and the auxiliary electrodes, the sources as well as the drains.

6. The thin film transistor array according to claim 5, wherein the passivation layer comprise a plurality of first contact holes and the pixel electrodes are filled into the first contact holes to be electrically connected to sources and the auxiliary electrodes.

7. The thin film transistor array according to claim 6, further comprises a gate-insulated layer, disposed between the sources, the drains and the gates, as well as between the auxiliary electrodes and the common-used distributed lines.

8. The thin film transistor array according to claim 7, wherein the passivation layer further comprises a plurality of second contact holes that pass through the passivation layer and the gate-insulated layer, and the plurality of conductive blocks are respectively filled into the second contact holes to be electrically connected to the common-used distributed lines.

9. The thin film transistor array according to claim 1, wherein the plurality of conductive blocks is respectively physically connected to the common-used distributed lines.

* * * * *